(12) United States Patent
Perdrigeon et al.

(10) Patent No.: US 11,781,446 B2
(45) Date of Patent: Oct. 10, 2023

(54) DEVICE FOR DISTRIBUTING OIL FROM A ROLLING BEARING FOR AN AIRCRAFT TURBINE ENGINE

(71) Applicant: SAFRAN AIRCRAFT ENGINES, Paris (FR)

(72) Inventors: Christoph Marcel Lucien Perdrigeon, Moissy-Cramayel (FR); Regis Eugene Henri Servant, Moissy-Cramayel (FR); Guillaume Francois Jean Bazin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/760,277

(22) PCT Filed: Feb. 7, 2021

(86) PCT No.: PCT/FR2021/050223
§ 371 (c)(1),
(2) Date: Aug. 5, 2022

(87) PCT Pub. No.: WO2021/165598
PCT Pub. Date: Aug. 26, 2021

(65) Prior Publication Data
US 2023/0077003 A1    Mar. 9, 2023

(30) Foreign Application Priority Data

Feb. 17, 2020    (FR) ........................................ 2001554

(51) Int. Cl.
*F01D 25/16*    (2006.01)
*F01D 25/18*    (2006.01)
(Continued)

(52) U.S. Cl.
CPC ......... *F01D 25/162* (2013.01); *F01D 25/183* (2013.01); *F02C 7/06* (2013.01);
(Continued)

(58) Field of Classification Search
CPC ........ F01D 25/162; F01D 25/183; F02C 7/06; F16C 33/6677; F16C 33/6685; F16C 2360/24; F05D 2260/98; Y02T 50/60
See application file for complete search history.

(56) References Cited

U.S. PATENT DOCUMENTS

| 10,082,037 | B2* | 9/2018 | Venter | .................. | F01D 11/005 |
| 2012/0020774 | A1* | 1/2012 | Bart | ..................... | F01D 25/162 |
| | | | | | 415/122.1 |

(Continued)

FOREIGN PATENT DOCUMENTS

| EP | 3112636 A1 | 1/2017 |
| FR | 3035154 A1 | 10/2016 |

(Continued)

OTHER PUBLICATIONS

International Search Report received for PCT Patent Application No. PCT/FR2021/050223, dated Mar. 16, 2021, 5 pages (2 pages of English Translation and 3 pages of Original Document).

*Primary Examiner* — Brandon D Lee
(74) *Attorney, Agent, or Firm* — WOMBLE BOND DICKINSON (US) LLP (57) ABSTRACT

Device for distributing oil from a rolling bearing (8) for an aircraft turbine engine, comprising: —a rolling bearing (8), —a body (5) for distributing oil, which body is configured to be mounted on a turbine engine shaft (4), said body comprising: i) a first outer cylindrical surface (5a) for mounting the inner ring (12) of the bearing, ii) a ring-shaped scoop (11) for recovering oil, iii) a ring-shaped track (26) of a dynamic seal (22), iv) a circuit (7) for lubricating the bearing and cooling the track, said circuit being formed in (Continued)

the body, characterised in that the ring-shaped scoop is the first scoop (11a) which supplies a first portion (7x) of the circuit with a view to cooling the track, and in that the body comprises a second ring-shaped scoop (11b) for recovering oil, which scoop supplies a second portion (7y) of the circuit with a view to lubricating the bearing.

11 Claims, 5 Drawing Sheets

(51) Int. Cl.
  *F02C 7/06* (2006.01)
  *F16C 33/66* (2006.01)
(52) U.S. Cl.
  CPC ...... *F16C 33/6677* (2013.01); *F16C 33/6685* (2013.01); *F05D 2260/98* (2013.01); *F16C 2360/24* (2013.01)

(56) References Cited

U.S. PATENT DOCUMENTS

2016/0305283 A1   10/2016   Morreale et al.
2016/0376947 A1*  12/2016   Lucas ................ F16C 33/6659
                                                    29/888.011

FOREIGN PATENT DOCUMENTS

FR          3066549 A1    11/2018
WO      2015/075355 A1    5/2015

\* cited by examiner

DEVICE FOR DISTRIBUTING OIL FROM A ROLLING BEARING FOR AN AIRCRAFT TURBINE ENGINE

TECHNICAL FIELD OF THE INVENTION

The present invention relates to an oil distribution device of a rolling bearing for an aircraft turbine engine.

TECHNICAL BACKGROUND

The prior art includes, but is not limited to, FR-A1-3,035, 154, FR-A1-3,066,549, WO-A1-2015/075355, US-132-10, 082,037 and EP-A1-3,112,636.

In a known way, a turbine engine comprises a certain number of rolling bearings which are intended to support the rotor of the turbine engine in rotation, in particular with respect to a fixed support such as the casing of the latter.

During operation, oil is typically injected onto the rollers of these bearings in order to lubricate and cool them. To prevent oil from spreading throughout the engine, it is necessary to confine the rolling bearing inside oil enclosures and to seal these oil enclosures from air enclosures adjacent to the engine, which must be free of oil.

More precisely, some oil enclosures are defined between the shaft supported in rotation by the rolling bearing and an annular cover integral with a fixed support linked to the turbine engine casing and arranged around the shaft. A dynamic annular seal is generally positioned between the shaft and the cover to ensure a seal between the oil enclosure and an air enclosure adjacent to the latter. Typically, the dynamic seal is mounted inside a end plate that is attached to the cover.

The dynamic seals typically used in rolling bearing oil enclosures for turbine engines are segmented radial seals (JRS), comprising a plurality of annulus sectors distributed circumferentially around a seal track rotating with the rotor shaft. These sectors are in sliding contact with the seal track. Friction between the seal sectors and the seal track generates heat that must be removed in order to maintain the mechanical integrity of these elements. One technique is to circulate cooling oil along the internal wall of the seal track.

The dynamic seal may be located immediately adjacent to a rolling bearing that is lubricated by oil during operation. It is known to lubricate a rolling bearing via an oil distribution ring. The rolling bearing is mounted on the oil distribution ring, which includes a scoop for recovering oil sprayed from a nozzle, in order to collect this oil and supply it to a lubrication circuit of the bearing.

The present invention provides an improvement to this technology which, in particular, enables to optimize the cooling of the track of a dynamic seal, for example of the JRS type, arranged next to a lubricated rolling bearing.

SUMMARY OF THE INVENTION

The invention relates to an oil distribution device of a rolling bearing for an aircraft turbine engine, comprising:
  a rolling bearing comprising two rings, respectively internal and external,
  an oil distribution body configured to be mounted on a turbine engine shaft, this body comprising:
    i) a first external cylindrical surface for mounting the internal ring of the bearing,
    ii) an annular oil recovery scoop,
    iii) an annular track of a dynamic seal,
    iv) a circuit for lubricating said bearing and cooling the track, this circuit being formed in the body,
  characterized in that the annular scoop constitutes the first scoop which supplies a first portion of said circuit for cooling the track, and in that the body comprises a second annular oil recovery scoop which supplies a second portion of said circuit for lubricating the bearing.

On the one hand, the invention enables to reduce the number of parts and therefore the design of the device since its body integrates several functions, namely that of the distribution ring which supports and lubricates the bearing, as well as that of the track of the dynamic seal. The device can thus have a smaller overall dimension, in particular radially and axially, compared to the prior art. The invention also enables to simplify the oil circuit, which serves both to lubricate the bearing and to cool the seal track. Indeed, the circulation of oil in the vicinity of this track allows it to be cooled by thermal conduction, which is particularly advantageous. The passage of oil in the circuit does not necessarily require a special sealing system, which also limits the risk of uncontrolled oil leakage during operation. In addition, the reduction in the diameter of the track leads to a reduction in the leakage cross-section to be sealed by the dynamic seal, which further improves the efficiency of the sealing device.

The disadvantage of using a single scoop to supply the circuit and to both lubricate the bearing and cool the seal track is a risk of undersupplying the seal track and thus poor cooling of the latter.

The two scoops enable to supply the two portions of the circuit separately, and thus to generate a first oil flow for cooling the seal track and a second oil flow for lubricating the bearing.

The role of the two scoops is therefore to supply the portions of the circuit adequately while increasing as little as possible the size of the part. The seal track is cooled by a dedicated oil flow which guarantees this cooling.

The device according to the invention may include one or more of the following features, taken alone from each other, or in combination with each other:
  the first scoop has a smaller diameter than the second scoop;
  the scoops are generally L-shaped in axial section and each comprise a cylindrical portion, one end of which is connected to an annular flange, the cylindrical portions extending around each other and the annular flanges being axially offset from each other;
  the first portion of the circuit comprises at least a first channel extending in the body between the first scoop and said track;
  the second portion of the circuit comprises at least one second channel extending in the body between the second scoop and ducts for supplying oil to the bearing;
  the first portion comprises a second channel of annular shape and in which longitudinal ribs are located, and the second portion comprises independent first longitudinal channels spaced around a longitudinal axis of the body;
  the scoops are formed in one piece with the body and its track;
  the first scoop is formed in one piece with said track, the second scoop being carried by a nut screwed onto the first scoop and preferably bearing on the internal ring of the bearing;
  said body comprises:
    claw teeth configured to cooperatively engage with complementary claw teeth of said shaft, and/or an annular abutment configured to cooperate by axial abutment with a corresponding cylindrical shoulder of said shaft.

said body comprises a second external cylindrical surface for supporting the seal, said body comprises an annular shoulder for abutting a first axial end of the internal ring, said body further comprising a screw thread for a nut configured to abut a second, opposite axial end of the internal ring, said thread is located between said first and second surfaces, said scoop is located at a first axial end of said body, and said track (or said second surface) is located at a second opposite axial end of the body.

The invention further relates to a turbine engine, in particular of an aircraft, comprising at least one device as described above.

The turbine engine according to the invention may comprise one or more of the following features, taken alone from each other, or in combination with each other:

the turbine engine comprises a shaft around which the device is mounted and a journal, the body of the device being clamped axially between an annular shoulder of the shaft and the journal which is urged axially into abutment against the body by screwing a nut onto the shaft, the turbine engine comprises an oil nozzle in an annular space delimited by said scoop, and in particular between the scoop and said shaft, the nozzle comprises two oil spray outlets, a first of which is configured to supply the first scoop and a second of which is configured to supply the second scoop.

BRIEF DESCRIPTION OF THE FIGURES

Further features and advantages will be apparent from the following description of a non-limiting embodiment of the invention with reference to the attached drawings in which.

DETAILED DESCRIPTION OF THE INVENTION

Figure 1:
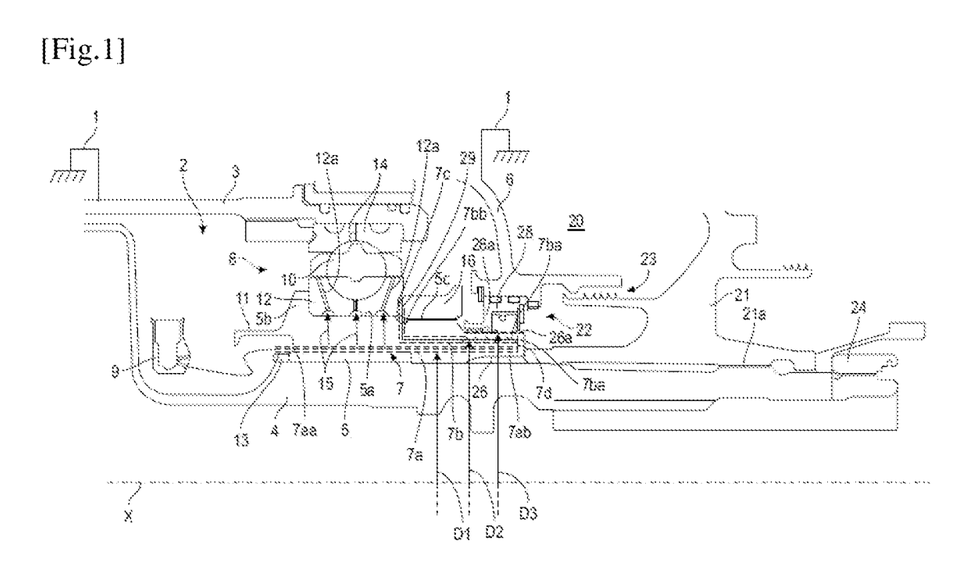
FIG. 1 is a partial schematic half-view in axial section of a turbine engine comprising an oil distribution device.

FIG. 1 shows a partial schematic of an oil enclosure 2 of an aircraft turbine engine bearing.

This oil enclosure 2 is bounded on the inside by a shaft 4 rotating about an axis X, and on the outside by an annular cover 6 and a bearing support 3 which are integral with a casing 1 of the turbine engine and which is arranged around the shaft 4.

An oil distribution ring 5 is arranged around the shaft 4 coaxially to it, and is rotationally fixed to it.

The oil enclosure 2 contains a bearing 8 comprising a plurality of rolling elements 10 engaged between an internal ring 12 mounted on the distribution ring 5, preferably by shrink-fitting, and an external ring 14 integral with the bearing support 3 fixed to the casing 1 of the turbine engine. The bearing support 3 may have a certain flexibility.

In the example shown in the figures, the rolling elements 10 are balls. Nevertheless, the type of rollers or rolling elements is not limiting in the context of the present invention.

Oil is injected into the oil enclosure 2 to lubricate and cool the rolling elements 10 of the bearing. For this purpose, oil is circulated through a lubrication circuit 7 integrated in the distribution ring 5 to an external cylindrical surface 5a of the distribution ring 5, which is used for mounting the internal ring 12.

The oil is brought by an oil nozzle 9 which is located upstream of the distribution ring 5 (the expressions "upstream" and "downstream" refer here to the general flow of gases in the turbine engine). The ring 5 has a generally annular shape about the axis X and comprises at its upstream end a scoop 11 for recovering oil sprayed by the nozzle 9. This scoop is in the form of a cylindrical flange oriented upstream in the example shown. The scoop 11 extends around and at a distance from the shaft 4 and defines with it an annular space for receiving the oil from the nozzle 9.

The oil circuit 7 comprises at least one inlet opening at the upstream end of the distribution ring 5, in the aforementioned oil receiving space.

In the example shown, this inlet is formed by an upstream end 7aa of at least one channel 7a that has an elongated shape along the axis X and comprises a downstream end 7ab located at the downstream end of the distribution ring 5.

Also at its upstream end, the ring 5 comprises an annular row of claw teeth 13 that are oriented axially upstream and are engaged between complementary claw teeth on the shaft 4. This cooperation serves to rotationally secure the ring 5 to the shaft 4. As seen in the drawing, the end 7aa is located radially between the claw teeth 13 and the scoop 11.

Oil ducts 15 oriented substantially radially to the axis X extend from the channel 7a to the surface 5a of the ring 5 for lubrication of the bearing 8.

The internal ring 12 of the bearing 8 also includes an integrated oil circuit 12a for circulating the oil fed by the circuit 7 of the ring 5, to lubricate the rolling elements and their cage. The internal ring 12 bears axially upstream on an annular shoulder 5b of the ring 5. Downstream of the mounting surface 5a of the internal ring 12, the distribution ring 5 comprises an external thread 5c for screwing on a nut 16 which bears axially on the downstream end of the ring 12 in order to clamp it axially against the shoulder 5b.

The oil enclosure 2 further comprises a sealing system for sealing this oil enclosure from an adjacent air enclosure 20 which must be free of oil.

To this end, the sealing system comprises, in particular, a dynamic annular seal 22. Typically, this dynamic seal 22 is composed of carbon annulus sectors. The dynamic seal 22 is held in an annular end plate 28 which is itself mounted inside the cover 6.

The end plate 28 has a portion 28a with an L-shaped cross-section that receives the dynamic seal 22.

The dynamic annular seal 22 is associated with a seal track 26, which is rotatable and carried by the shaft 4. The track 26 has a contact surface 26a, in sliding contact with the dynamic annular seal 22. The contact surface 26a and the track 26 are treated to improve seal/track sliding and minimize wear of the dynamic annular seal 22.

The sealing system also comprises a labyrinth seal 23 arranged downstream of the dynamic seal 22, between a journal 21 mounted on the shaft 4 and the cover 6.

The journal 21 is fixed in rotation with the shaft 4 by means of splines 21a. The journal 21 is located downstream of the distribution ring 5 and comprises an upstream end bearing axially against the downstream end of the ring 5, this downstream end forming an axial abutment. A nut 24 is screwed onto the shaft 4, downstream of the journal 21, in order to press it axially against the ring 5, which is itself held axially tight against the claw teeth of the shaft 4. In addition, the ring 5 is preferably shrunk onto the shaft 4 to guarantee its centering.

The distribution ring 5 and the track 26 of the dynamic seal 22 are formed in one piece, for example by additive manufacturing. The ring 5 and the track 26 are thus formed by a one-piece body that integrates the circuit 7.

As seen in the drawings, the circuit 7 extends axially downstream to the track 26 for conductive cooling of the surface 26a.

The aforementioned channel 7a thus has its downstream end 7ab located closest to the downstream end of the track 26 and the body, and is surrounded by the surface 26a. In the example shown, the channel 7 is straight and located on a circumference centered on the axis X having a diameter D1. The surface 26a is located on a circumference centered on this axis X having a diameter D3.

The circuit 7 comprises at least one further channel 7b which has a generally elongated and preferably rectilinear shape and is located on a circumference centered on the axis X of diameter D2. D1 is less than D2 which is less than D3, meaning that channel 7b extends between the channel 7a and the surface 26a.

The channel 7b has a downstream end 7ba connected to the downstream end 7ab of the channel 7a and an upstream end 7bb which opens onto the surface 5a, or into the thread 5c, or between the surface 5a and the thread 5c, as in the example shown. This end 7bb may be bent in an L-shape and comprise a portion oriented radially outwards and opening, for example, into an annular groove 7c provided on the ring 5, which opens radially outwards.

The connection of the ends 7ab and 7ba can be realized by at least one C-bent conduit 7d for example.

The nut 16 may comprise at least one integrated oil flow channel 29, which is intended to receive oil from the groove 7c. This channel 29 is, for example, inclined from upstream to downstream radially outwardly and comprises a radially internal end opening facing the groove 7c, and a radially external end opening outwardly for the purpose of projecting oil outwardly. This allows the nut 16 to act as a centrifugal drop thrower, which allows the oil used to lubricate the bearing 8 and/or to cool the seal 22 to be thrown away from the seal. The presence of oil on the seal 22 could reduce its efficiency.

By integrating the cooling circuit with the seal track 26, the diameter of the seal track 26 can be reduced, which has a dual benefit. Firstly, it reduces the radial space requirement in this area. In addition, the friction of the seal 22 on the track 26 is less important due to the lower peripheral speeds. Finally, the passage section between the seal 22 and the track 26 is smaller and therefore the leaks are also smaller.

FIG. 1 shows schematically by arrows the oil flow path during operation. The oil is sprayed by the nozzle 9 into the space defined by the scoop 11 and enters the circuit 7. Oil is conveyed to the bearing 8 for lubrication and to the vicinity of the surface 26a for cooling by conduction. The lubricating oil is naturally centrifuged by the bearing 8, and the cooling oil from the track 26 is conveyed to the groove 7c where it is then discharged through the channel 29 of the nut 16.

Figure 2:
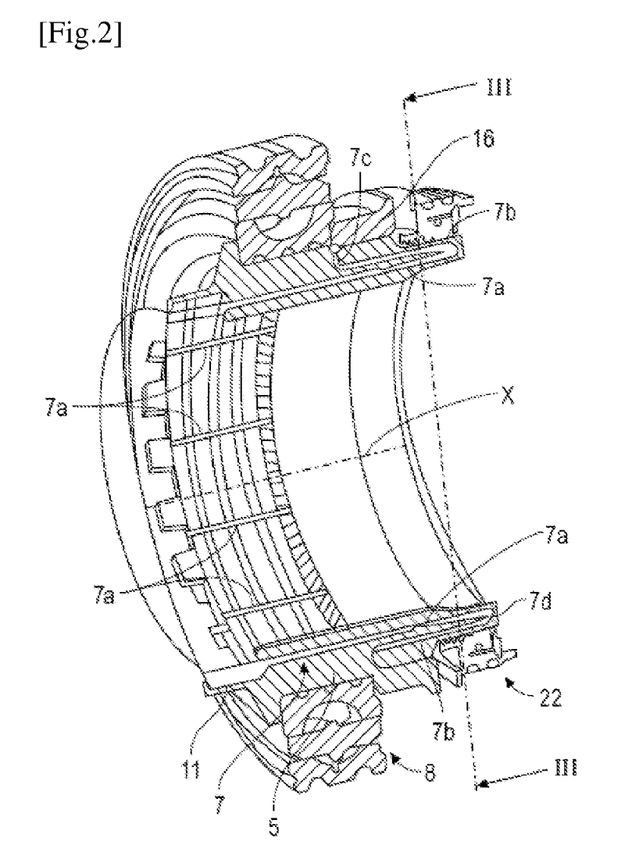
FIG. 2 is a partial schematic perspective view of the device shown in FIG. 1 in axial section.

From FIG. 2, it can be seen that the circuit 7 may include several channels 7a, 7b evenly spaced around the axis X. The body may comprise up to ten channels 7a or more. These channels 7a can have a circular shape in section. Their cross-section may also change along the axis X. They can each have a circular cross-section on an upstream segment and a rectangular cross-section on a downstream segment.

The body may also comprise up to ten or more channels 7b. These channels 7b may be circular in cross-section. Their cross-section can also change along the axis X. They can each have a circular section on an upstream segment and a rectangular section on a downstream segment.

The channels 7a, 7b here extend parallel to the axis X although this is not limiting.

The Applicant has noted that the supply of the circuit by a single scoop can lead to a problem of insufficient cooling of the track 26. Indeed, the rolling elements 10 of the bearing 8 create a pumping phenomenon when they pass over the outlets of the ducts 15 conveying the oil. The bearing 8 consumes between 80% and 90% of the oil flow provided by the circuit 7, compared with only 20% to 10% for the track 26. It is difficult to control these proportions with precision and there is therefore a risk of under-supply of oil to track 26.

In order to ensure the correct flow of oil for cooling the track 26 and lubricating the bearing 8, in each of the circuits while remaining as compact as possible, the proposed solution consists of using two separate scoops, each of which is dedicated to supplying one portion of the circuit.

Figure 3:
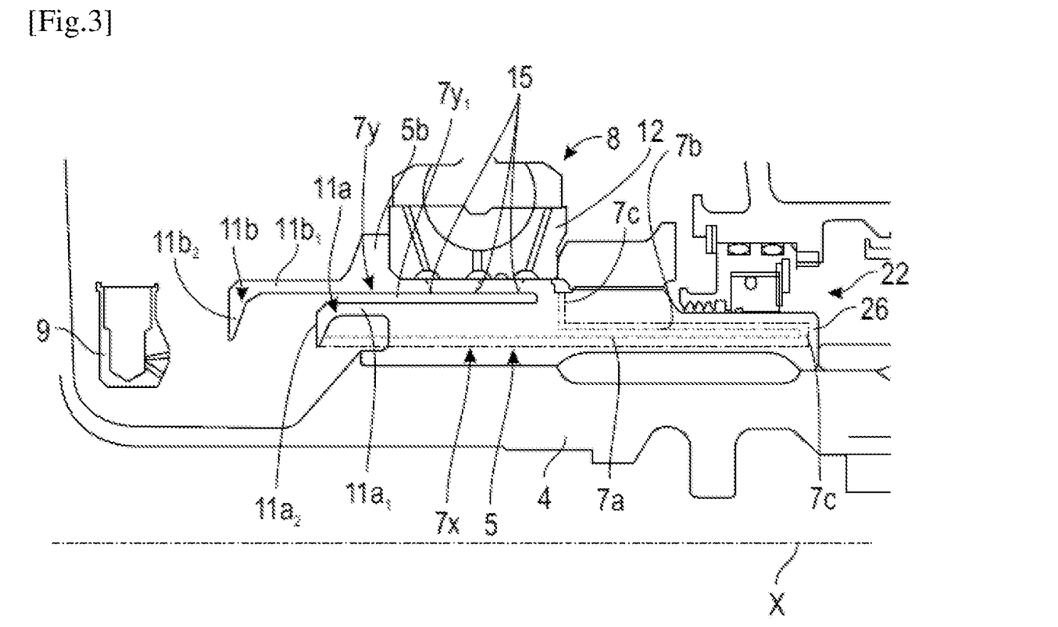
FIG. 3 is a partial schematic half-view in axial section of a turbine engine comprising an oil distribution device according to an embodiment of the invention.
Figure 4:
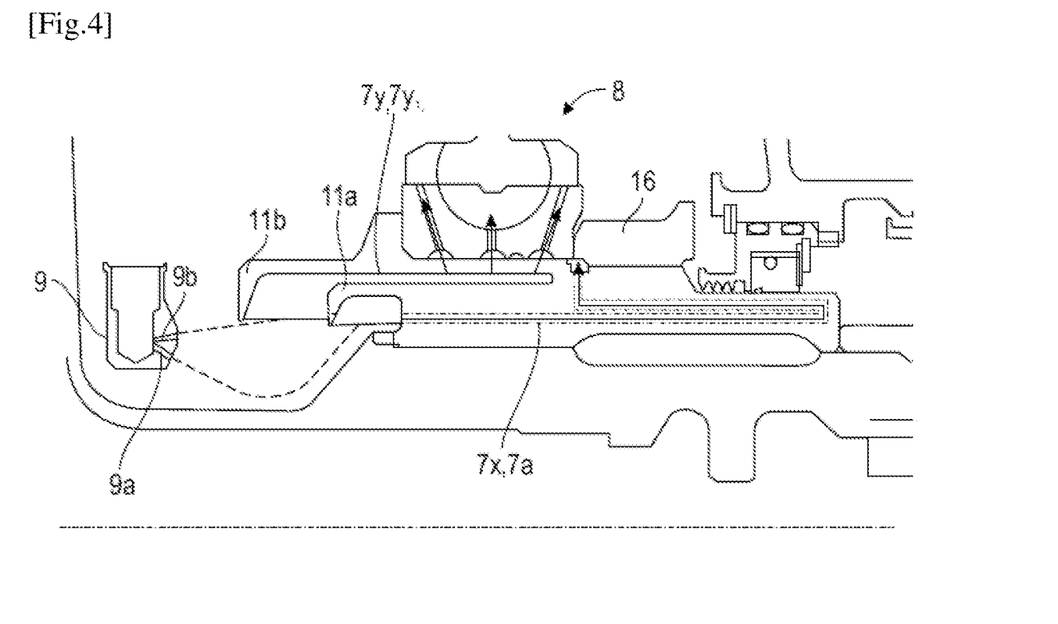
FIG. 4 is a view similar to FIG. 3 and shows the flow of lubricating oil and cooling oil.
Figure 5A:
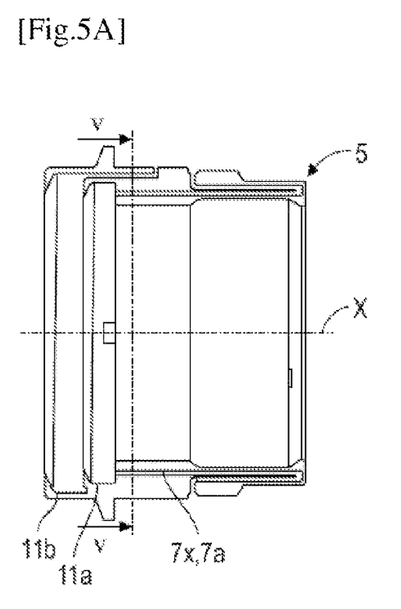
FIGS. 5A and 5B are schematic views, respectively in axial section and in cross-section (along the V-V line), of a body of the device of FIG. 3.
Figure 5B:
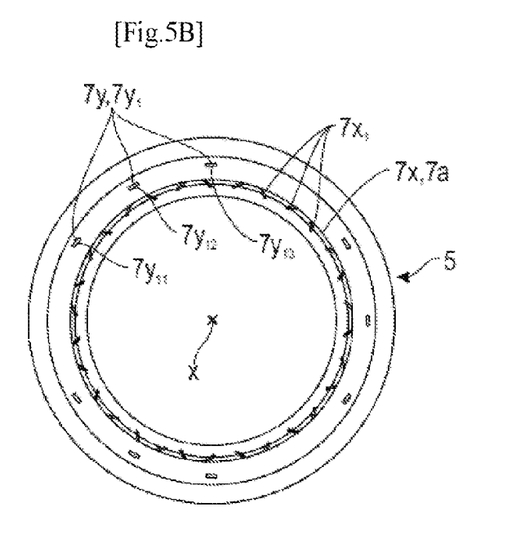

FIGS. 3 to 5 illustrate a first embodiment of a device according to the invention. This device includes all of the features of the device described herein unless they conflict with the following and the drawings.

The device comprises a first annular scoop 11a, similar to the scoop 11 of the device of FIGS. 1 and 2, and which supplies a first portion of said circuit 7 for cooling the track 26.

The body 5 of the device further comprises a second annular oil recovery scoop 11b which supplies a second portion of said circuit for lubrication of the bearing.

In the example shown, the first scoop 11a has a smaller diameter than the second scoop 11b.

The scoops 11a, 11b are generally L-shaped in axial cross-section and each comprise a cylindrical portion 11a1, 11b1, one axial end of which is connected to an annular flange 11a2, 11b2. The cylindrical portions 11a1, 11b1 extend around each other and the annular flanges 11a2, 11b2 are axially offset from each other. Here, the flange 11b2 is located upstream of the flange 11a2.

The flanges 11a2, 11b2 have predetermined radial dimensions so as to guarantee the retention of the oil projected by the nozzle 9 during operation and thus avoid any overflow of this oil (see FIG. 4).

The first portion 7x of the circuit 7 comprises at least a first channel 7a extending in the body 5 between the first scoop 11a and the track 26. From FIGS. 5A and 5B, it can be seen that this channel has an annular shape. Longitudinal ribs 7x1 are located in the channel 7a and extend along all or part of its length to facilitate the conveying of the oil while limiting pressure losses. Furthermore, due to the relatively long length of the channel 7, the ribs 7x1 ensure the connection between the radially internal and external annular segments of the body 5 separated by this channel 7.

The downstream end of the channel 7a can be connected to other elements (7b, 7c, 7d) similar to those of FIGS. 1 and 2.

The second portion 7y of the circuit 7 comprises at least one second channel 7y1 extending into the body 5 between the second scoop 11b and ducts 15 for supplying oil to the bearing. FIGS. 5A and 5B illustrate a preferred embodiment in which the second portion 7y comprises a plurality of independent longitudinal channels 7y1 spaced around the longitudinal axis X of the body 5. In the example shown, there are three series of three channels 7y1. In each of these series, a first channel 7y11 is connected to a conduit 15 supplying an upstream segment of the ring, a second channel 7y12 is connected to another conduit 15 supplying a middle segment of the ring 12, and a third channel 7y13 is connected to yet another conduit 15 supplying a downstream segment of the ring.

FIG. 4 illustrates the path of the oil from the nozzle 9. Advantageously, this nozzle 9 comprises a first oil projection outlet 9a, oriented for example radially inwards, and configured to supply oil to the first scoop 11a. This oil then travels in the first channel 7a for the purpose of cooling the track 26, and until it emerges at the level of the nut 16 similar to that of FIGS. 1 and 2.

The nozzle 9 comprises a second oil projection outlet 9b, oriented for example radially outwards, and configured to supply oil to the second scoop 11b. This oil then travels through the channels 7y1 to lubricate the bearing 8.

In the embodiment shown in FIGS. 3 to 5B, the scoops 11a, 11b are formed in one piece with the body 5 and its track 26.

Figure 6:
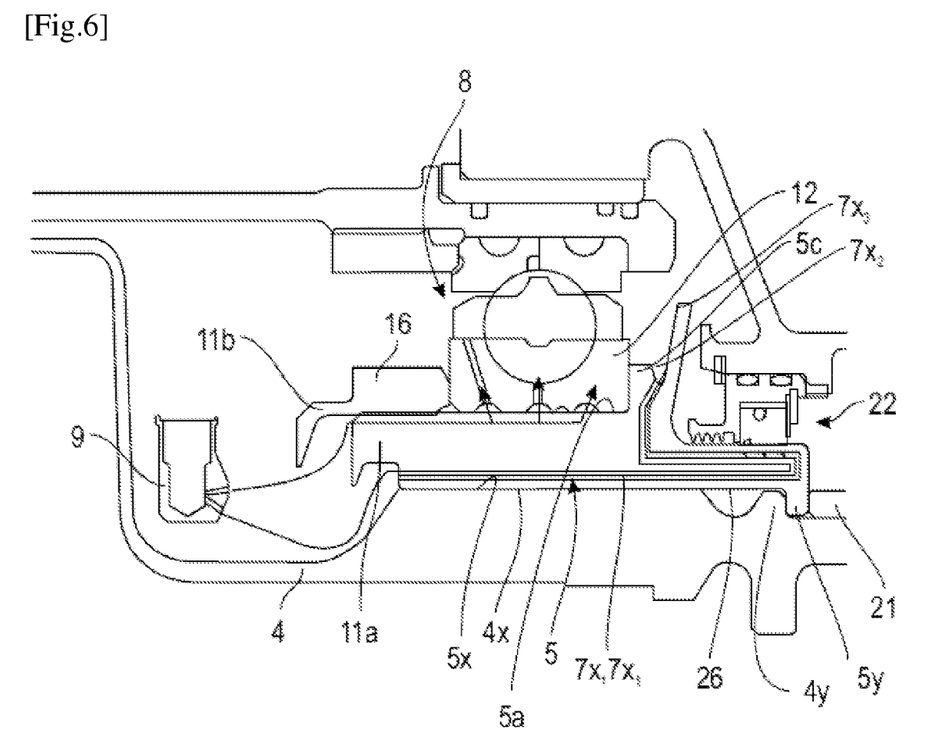
FIG. 6 is a partial schematic half-view in axial section of a turbine engine comprising an oil distribution device according to a variant of the invention.

In the variant shown in FIG. 6, the first scoop 11a is formed in one piece with the track 26, while the second scoop 11b is carried by a nut 16' screwed onto the first scoop 11a.

Contrary to the previous design and to the device shown in FIGS. 1 and 2, the internal ring 12 of the bearing 8 does not bear on an upstream shoulder 5b of the body but on a downstream shoulder 5c of this body.

The nut 16' for immobilizing the internal ring 12 is therefore not screwed onto a downstream thread of the body 5 but onto an upstream thread of this body. This nut 16' is screwed from upstream onto this thread, which is arranged upstream of the surface 5a, and bears axially on an upstream end of the ring 12, which is therefore clamped axially between this nut 16' and the shoulder 5c.

The second scoop 11b is integrated into this nut 6' and projects from the upstream end of this nut.

The first portion 7x of the circuit 7 dedicated to the cooling of the runway 26 opens into an annular groove 7x2 formed in the shoulder 5b, just upstream of an annular web 7x3 for oil flow by centrifugal effect. This web 7x3 is also integrated into the body 5.

In addition, in this variant, the body 5 is shrunk onto the external cylindrical surface 4x of the shaft by its internal cylindrical surface 5x, so as to immobilize the body 5 in rotation with respect to the shaft 4. The axial abutment of the body 5 on the shaft 4 is achieved by an annular abutment 5y carried by the body 5, here at its downstream end, and clamped axially between a cylindrical shoulder 4y of the shaft 4 and the upstream end of a journal 21 similar to that of FIG. 1.

In the embodiment shown in FIGS. 3 to 5B, the shrink fit between the body 5 and the shaft 4 is located just inside the bearing 8. Its length is reduced to just what is necessary to save weight and to avoid mounting problems. The axial abutment is ensured by the shaft 4 and the anti-rotation by clawing. It is located on the front of the ring to prevent mounting problems.

The oil distribution device according to the invention comprises the body, which thus integrates the functions of the distribution ring and the seal track of the prior art. The ring itself can be considered to have several functions of scooping oil from the nozzle, and of supporting and positioning this bearing. The oil circuit integrated in the body also has two functions: lubrication of the bearing and cooling of the seal track.

Additive manufacturing is a particularly suitable method to realize this body.

Major advantages of the invention include compacting the device, eliminating parts, increasing the efficiency of the dynamic seal, and decreasing the on-board mass.

The invention claimed is:

1. An oil distribution device of a rolling bearing for an aircraft turbine engine, comprising:
   a rolling bearing comprising two rings, respectively internal and external,
   an oil distribution body configured to be mounted on a turbine engine shaft, this body comprising:
   i) a first external cylindrical surface for mounting the internal ring of the bearing,
   ii) an annular oil recovery scoop,
   iii) an annular track of a dynamic seal,
   iv) a circuit for lubricating said bearing and cooling the track, this circuit being formed in the body,
   wherein the annular scoop constitutes a first scoop which supplies a first portion of said circuit for cooling the track, and in that the body comprises a second annular oil recovery scoop which supplies a second portion of said circuit for lubricating the bearing.

2. The device of claim 1, wherein the first scoop has a smaller diameter than the second scoop.

3. The device according to claim 1, wherein the scoops are generally L-shaped in axial cross-section and each comprise a cylindrical portion, one end of which is connected to an annular flange, the cylindrical portions extending around each other and the annular flanges being axially offset from each other.

4. The device according to claim 1, wherein the first portion of the circuit comprises at least a first channel extending in the body between the first scoop and said track.

5. The device according to claim 1, wherein the second portion of the circuit comprises at least one second channel extending in the body between the second scoop and ducts for supplying oil to the bearing.

6. The device according to claim 4, wherein the first portion comprises a second channel of annular shape and in which longitudinal ribs are located, and the second portion comprises independent first longitudinal channels spaced around a longitudinal axis of the body.

7. The device according to claim 1, wherein the scoops are formed in one piece with the body and its track.

8. The device according to claim 1, wherein the first scoop is formed in one piece with said track, the second scoop being carried by a nut screwed onto the first scoop.

9. The device according to claim 1, wherein said body comprises:
   claw teeth configured to cooperatively engage with complementary claw teeth of said shaft, and/or
   an annular abutment configured to cooperate by axial abutment with a corresponding cylindrical shoulder of said shaft.

10. The device according to claim 8, wherein said nut bears on the internal ring of the bearing.

11. A turbine engine, comprising at least one device according to claim 1.

* * * * *

UNITED STATES PATENT AND TRADEMARK OFFICE
CERTIFICATE OF CORRECTION

Page 1 of 1

PATENT NO. : 11,781,446 B2
APPLICATION NO. : 17/760277
DATED : October 10, 2023
INVENTOR(S) : Christophe Marcel Lucien Perdrigeon et al.

It is certified that error appears in the above-identified patent and that said Letters Patent is hereby corrected as shown below:

On the Title Page

In Item [72] Inventors, please correct "Christoph Marcel Lucien Perdrigeon" to --Christophe Marcel Lucien Perdrigeon--.

Signed and Sealed this
Twenty-sixth Day of December, 2023

Katherine Kelly Vidal
*Director of the United States Patent and Trademark Office*